Patented Oct. 24, 1922.

1,433,503

UNITED STATES PATENT OFFICE.

JESSE C. FORKNER, OF FRESNO, CALIFORNIA.

FIG PRODUCT.

No Drawing.   Application filed May 16, 1921.   Serial No. 469,956.

*To all whom it may concern:*

Be it known that I, JESSE C. FORKNER, a citizen of the United States, and resident of Fresno, in the county of Fresno and the State of California, have invented a new and useful Improvement in Fig Products, of which the following is a specification.

My invention relates to a new product composed of fresh and dried figs, which product can be used as a confection, as an ingredient for candies, baker's goods or other edible purposes. It is known among those who handle figs that the taste of a dried fig is materially different from the taste of a fresh ripe fig, that dried figs vary in flavor, and that most undersized figs when dried have a flat flavor, and less sugar content than the larger varieties and the small figs are usually hard and fibrous.

Among the objects I have attained in my invention is the production of a paste or product out of figs which can be used as a confection, or which can be used in a variety of forms as ingredients with other edible products, such as a filler for chocolate candy and filler for pies and cakes, or it can be pressed into forms and is palatable without the additions referred to. It is also noted that the paste I have produced retains more nearly the natural taste of first grade figs, is uniform and blended, and that in part it can be made from dried figs which are not commonly rated as a commercially first class product.

To accomplish these and other objects hereinafter set forth I take approximately 100 pounds of fresh ripe figs, add approximately 80 pounds of sugar or its equivalent in syrup, and cook said mixture down to a weight of approximately 120 pounds to a jelly-like consistency. If the figs are naturally sweet, the sugar can be omitted. Ordinary dried figs are cleansed dipped in salt water, then dried, then steamed and dried again, after which the dried figs are ground into a paste. The grinding can be done by any of the well known means adaptable for that purpose. The fresh fig paste and the dry fig paste are then thoroughly mixed in the proportion of approximately one part of fresh paste to two parts dried fig paste. The fresh fig paste thus made is concentrated in sugar content and flavor, and by mixing the concentrated paste with the paste formed of the dried figs, the taste of the entire mass is blended so that it is changed into a new product which is equal, or superior to the first grade dried figs now on the market, notwithstanding the fact that dried figs used may be deficient in sugar content and flavor.

The process for making fig paste described has produced better results than other processes with which I have experimented, but it is herein noted that somewhat similar results may be obtained by cooking the dried figs and fresh figs together and adding the sweetening element if the natural figs are not sweet enough at some stage of the cooking process after which the mixture can be reduced to a paste. The basic element of my invention is combining fresh ripe figs with dried figs in producing a paste, the product thus created being a new product not heretofore produced, and the exact proportions of the fresh figs and the dried figs are not important.

I claim as new and ask for Letters Patent:

1. A process for making a food product consisting of cooking ten parts of fresh ripe figs and eight parts of sugar to a jelly, and mixing therewith a paste of ground ripe figs in the proportion of approximately two parts of paste to one of jelly, substantially as described.

2. A process for making a food product consisting of mixing together two parts of dehydrated figs which have been ground to a paste with one part of fresh ripe figs which have been cooked.

3. A fig product composed of dehydrated figs ground to a paste, fresh ripe cooked figs and sugar all thoroughly mixed together, substantially as described.

4. A food composed of cooked fresh ripe figs and ground dried figs mixed together.

5. A process for making a food product consisting of cooking fresh ripe figs to a jelly, then adding thereto a paste composed of ground dried figs in the proportion of approximately one part of the fig jelly to two parts of the paste, said paste and jelly being thoroughly mixed together, substantially as described.

6. A food composed of cooked fresh ripe sweetened figs and ground dried figs mixed together.

JESSE C. FORKNER.